United States Patent
Hsieh et al.

(10) Patent No.: US 8,264,831 B2
(45) Date of Patent: Sep. 11, 2012

(54) MOUNTING APPARATUS FOR PCI CARD

(75) Inventors: Chung-Cheng Hsieh, Taipei Hsien (TW); Li-Ping Chen, Taipei Hsien (TW); Ching-Wei Hsu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 173 days.

(21) Appl. No.: 12/730,358

(22) Filed: Mar. 24, 2010

(65) Prior Publication Data
US 2011/0110033 A1 May 12, 2011

(30) Foreign Application Priority Data
Nov. 12, 2009 (CN) .......................... 2009 2 0314595

(51) Int. Cl.
*H05H 5/00* (2006.01)
*H05K 7/00* (2006.01)
*H05K 7/18* (2006.01)
*H04M 1/00* (2006.01)

(52) U.S. Cl. ......... 361/679.32; 361/679.31; 361/679.43; 361/747; 361/732; 361/801; 455/575.1; 16/368

(58) Field of Classification Search .................. 361/681, 361/683, 679.01, 801, 804, 679.29, 679.55, 361/679.32, 679.43, 679.44, 679.58, 679.59, 361/728–732, 740; 455/575.3, 550.1, 56; 345/168, 173
See application file for complete search history.

(56) References Cited

U.S. PATENT DOCUMENTS
7,573,704 B2 * 8/2009 Chen et al. ............... 361/679.32
2010/0271768 A1 * 10/2010 Fan et al. .................. 361/679.4
* cited by examiner Primary Examiner — Jayprakash N Gandhi
Assistant Examiner — Jerry Wu
(74) Attorney, Agent, or Firm — Altis Law Group, Inc.

(57) ABSTRACT

A mounting apparatus includes a mounting bracket, a mounting piece adapted to mount a PCI card to the mounting bracket, and a securing member. The mounting bracket includes a base and a blocking plate. The mounting piece includes an elongated body and a mounting end. The securing member includes a first pivoting portion pivotably attached to the mounting bracket, a pressing portion, and a mounting portion. The mounting portion includes a securing portion. The securing portion includes a handling portion and a second engaging portion extending from the handling portion. The second engaging portion engages the first engaging portion. The handling portion is configured to drive the second engaging portion to disengage the first engaging portion by pressing the handling portion.

16 Claims, 6 Drawing Sheets

MOUNTING APPARATUS FOR PCI CARD

BACKGROUND

1. Technical Field

The disclosure generally relates to mounting apparatuses, especially, to a mounting apparatus for a peripheral component interconnect (PCI) card.

2. Description of Related Art

PCI cards are widely used in computers. The conventional method for installing PCI cards involves screws and screwdrivers. It is a tedious endeavor and often results in lost screws. A screw falling on the printed circuit board (PCB) while the computer is on can result in damage to the PCB. Furthermore, as more of such components are installed within the cramped computer enclosure, space becomes a major problem.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
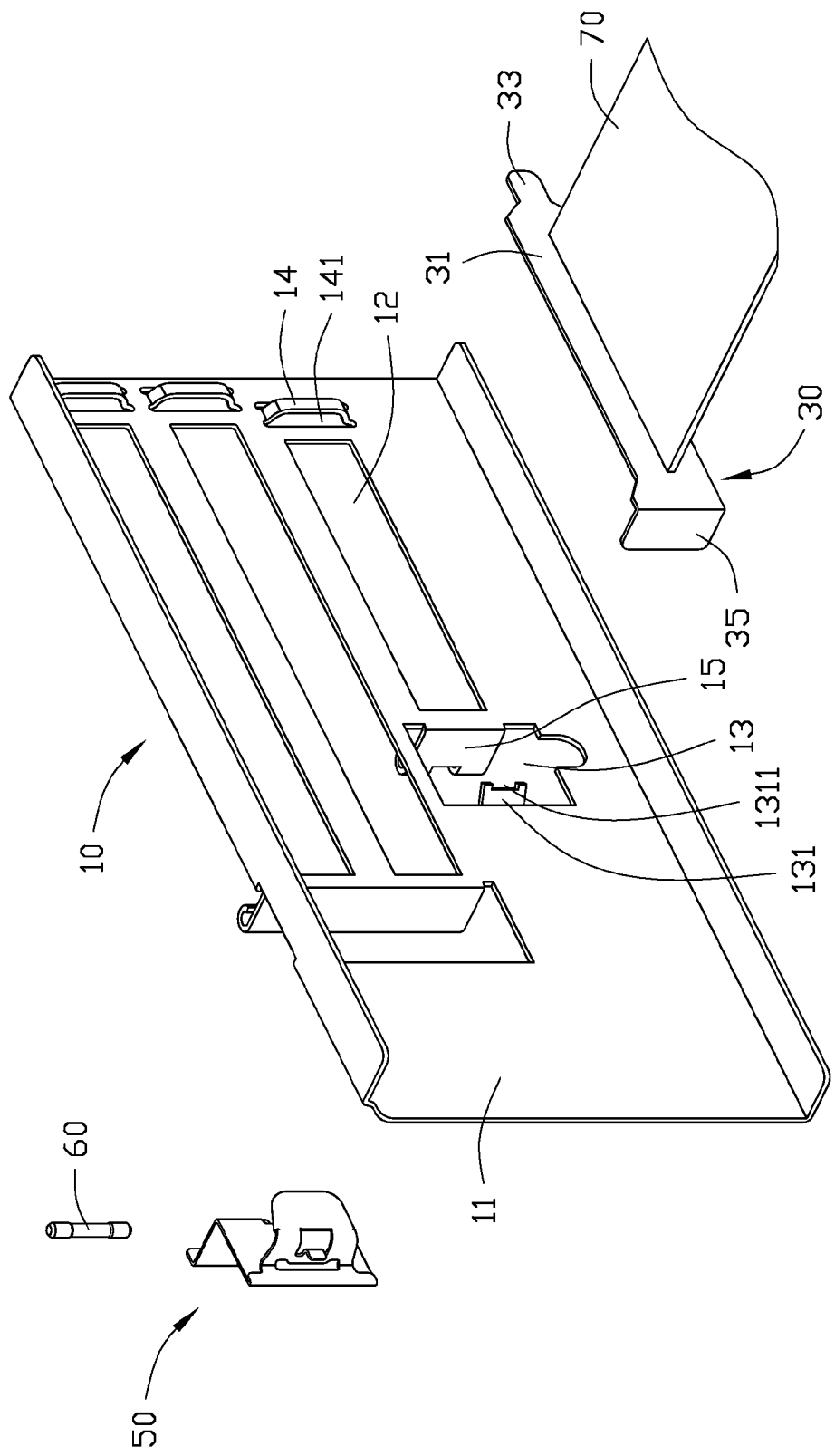
FIG. 1 is an exploded, isometric view of an embodiment of a mounting apparatus for a PCI card.
Figure 2:
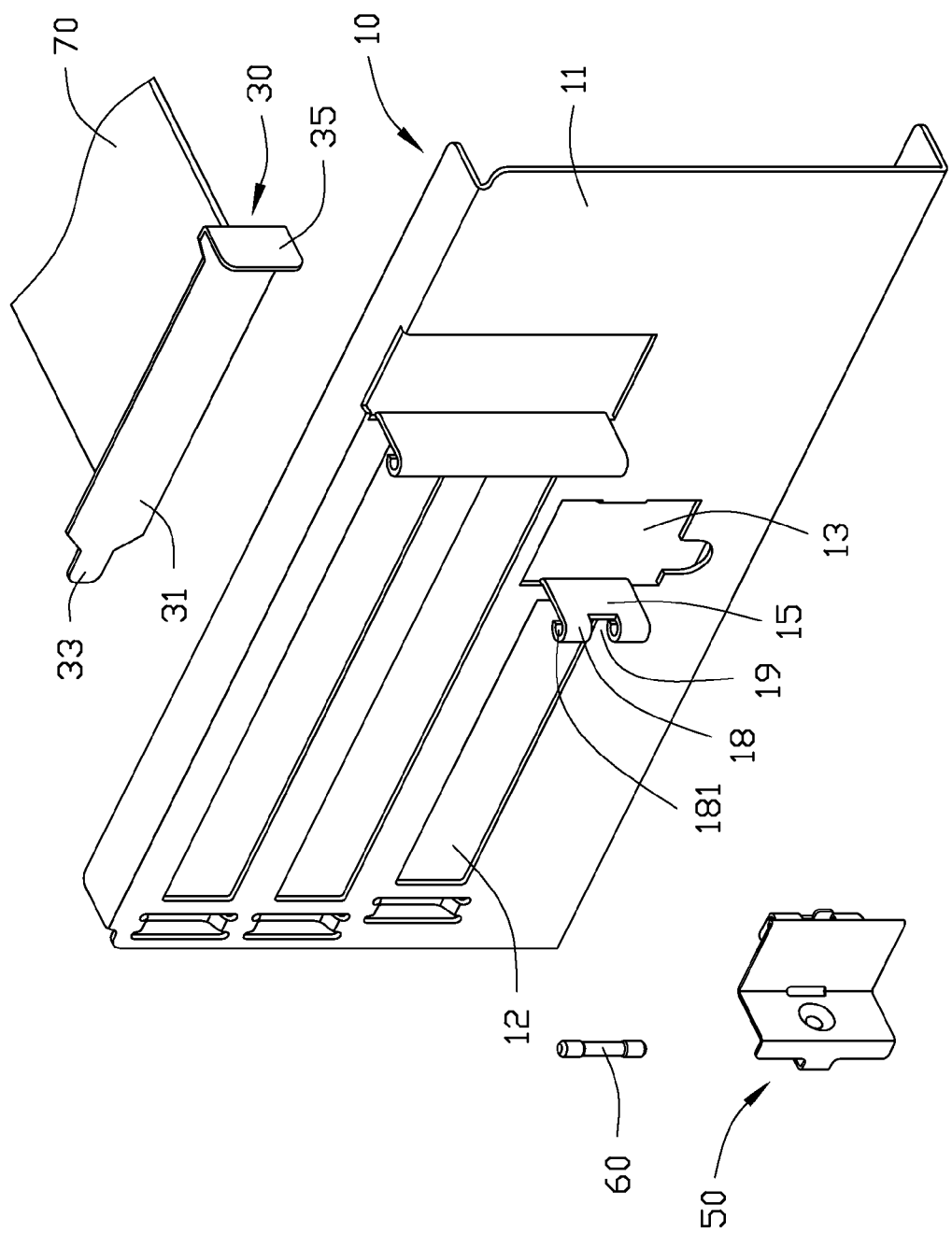
FIG. 2 is similar to FIG. 1, but viewed from another aspect.

Referring to FIGS. 1 and 2, an embodiment of a mounting apparatus for one PCI card 70. In the embodiment, a PCI card 70 is used. The mounting apparatus includes a mounting bracket 10, a mounting piece 30 mounted to the PCI card 70, and a securing member 50 pivotally mounted to the mounting bracket 10.

The mounting bracket 10 includes a rectangular base 11. A plurality of elongated rectangular slots 12 defined in the base 11. A plurality of bridge portions 14 located on the base 11 adjacent to one side of the elongated rectangular slots 12. Each bridge portion defines a securing slot 141. A mounting opening 13 is defined in the base 11 adjacent to the elongated rectangular slots 12. A blocking plate 15 is perpendicular to the base 11. The blocking plate 15 extends from a side edge of the mounting opening 13 adjacent to the elongated rectangular slots 12. Two first pivoting portions 18 are located at the distal end of the blocking plate 15. Each first pivoting portion 18 defines a first pivoting hole 181. A receiving notch 19 defines between the two first pivoting portions 18. A first engaging portion 131 protrudes from the other side edge of the opening 13 opposite to the blocking plate 15. The first engaging portion 131 defines a cutout 1311 at a distal end thereof.

The mounting piece 30 includes an elongated body 31, an insert end 33, and a mounting end 35. The elongated body 31 is configured to cover the corresponding elongated rectangular slot 12. The insert end 33 extends from one side of the elongated body 31 and is secured to the securing slot 141. The mounting end 35 extends from the other side of the elongated body 31.

Figure 3:
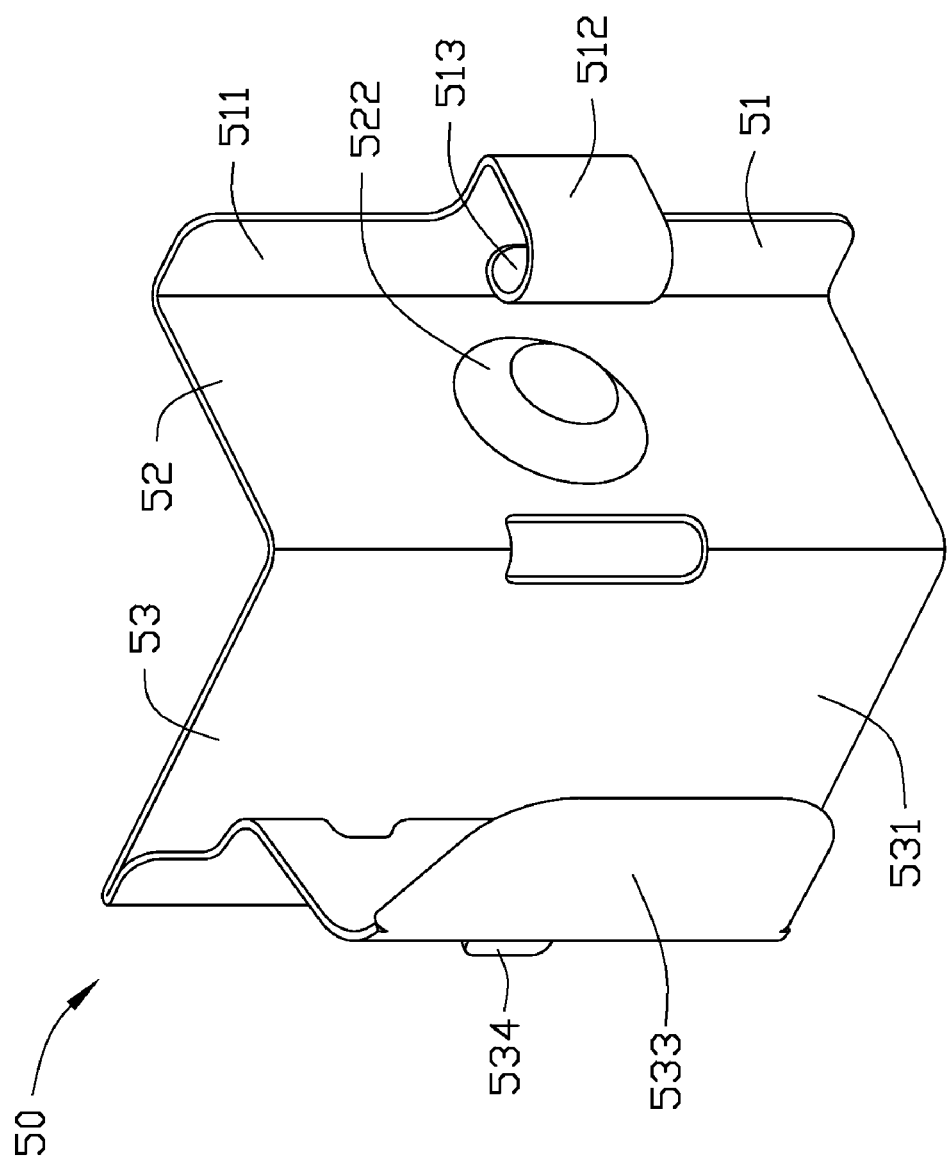
FIG. 3 is an enlarged isometric view of a securing member of FIG. 1.
Figure 4:
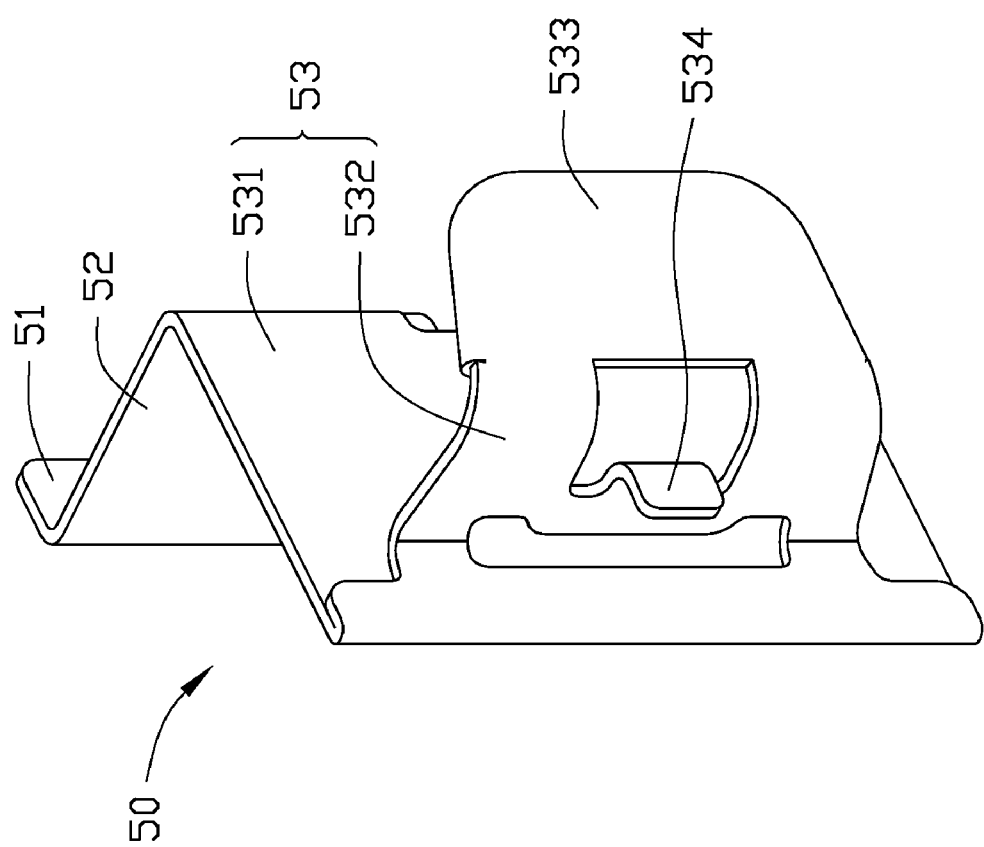
FIG. 4 is similar to FIG. 3, but viewed from another aspect.

Referring to FIGS. 3 and 4, the securing member 50 includes a second pivoting portion 51, a pressing portion 52, and a mounting portion 53. The pressing portion 52 extends from the second pivoting portion 51 and the mounting portion 53 extends perpendicularly from the pressing portion 52.

The second pivoting portion 51 includes a body 511 and a bent portion 512 extending from the body 511. The bent portion 512 defines a second pivoting hole 513 corresponding to the first pivoting holes 181 of the first pivoting portion 18.

The pressing portion 52 extends perpendicularly from the body 511 of the second pivoting portion 51. The pressing portion 52 includes a protrusion 522 that protrudes from the pressing portion 52. The protrusion 522 is configured to resist on the mounting end 35 of the mounting piece 30 to the blocking plate 15.

The mounting portion 53 includes a connecting plate 531 extending from the pressing portion 52, and a securing portion 532 extending from the connecting plate 531. The securing portion 532 includes a handling portion 533 extending from the securing portion 532 and a second engaging portion 534 extending from the handling portion 533. In one embodiment, the second engaging portion 534 is an elastic tab, and the handling portion 533 is an elastic plate. The second engaging portion 534 is capable of engaging with the cutout 1311 of the first engaging portion 131. The pressing portion 52 and the securing portion 532 are disposed at opposite sides of the connecting portion 531.

Figure 5:
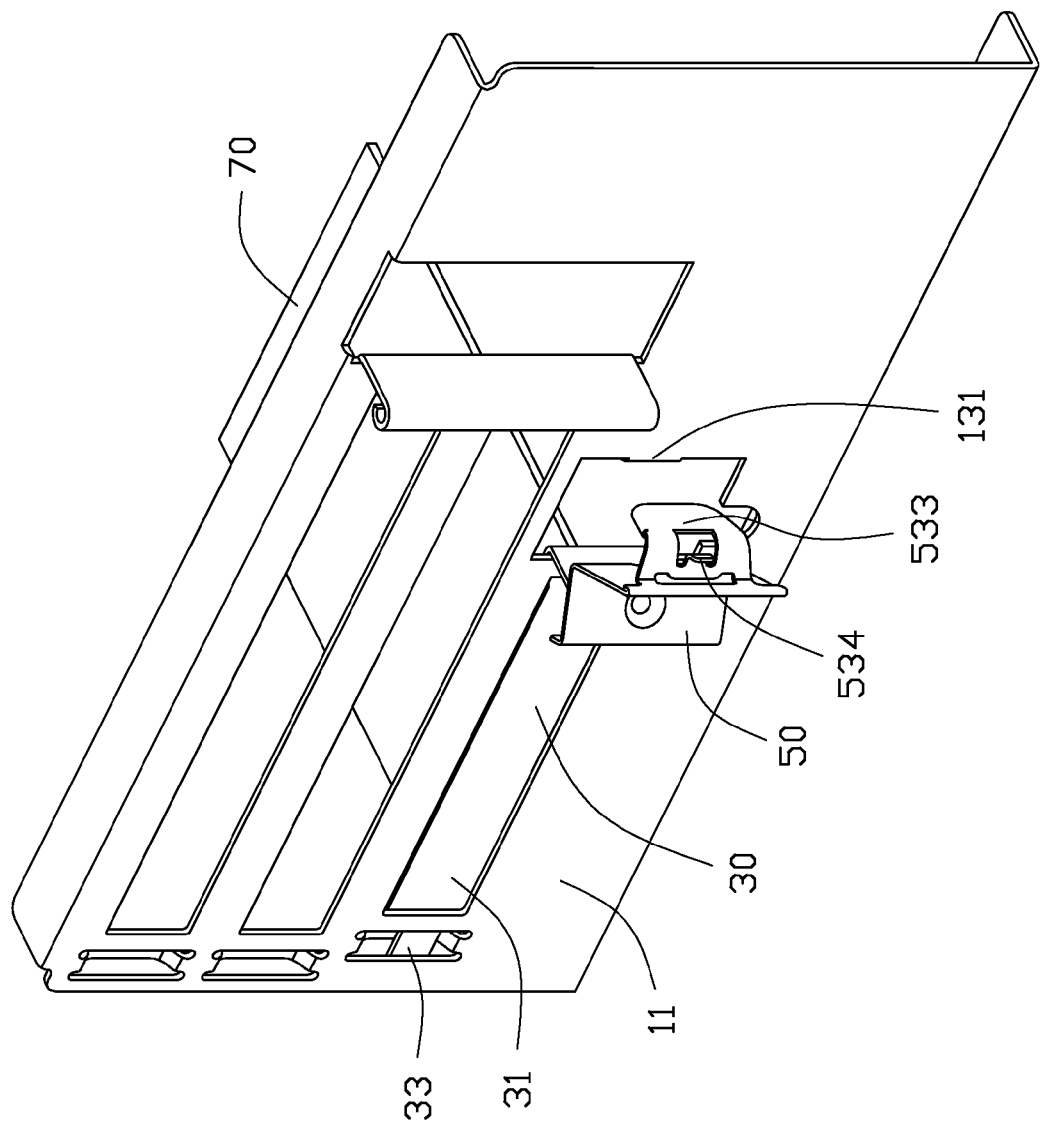
FIG. 5 is a pre-assembled view of FIG. 1.
Figure 6:
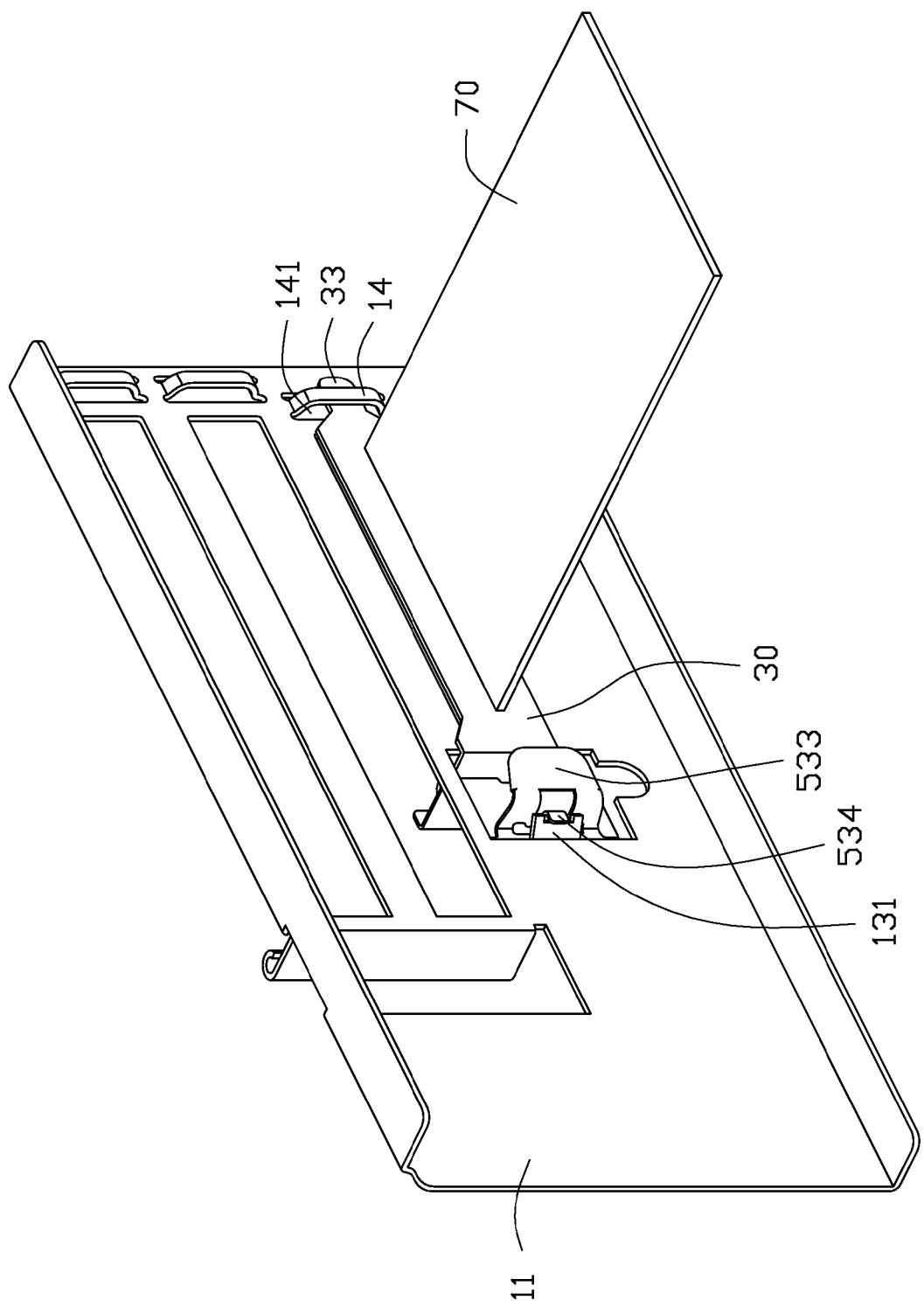
FIG. 6 is an assembled view of FIG. 1.

Referring to FIGS. 3 to 5, in assembly, the elongated body 31 of the mounting piece 30 covers the corresponding elongated rectangular slot 12. The insertion end 33 of the mounting piece 30 is inserted into the securing slots 141, and the mounting end 35 of the mounting piece 30 abuts the blocking plate 15 through the opening 13. The bent portion 512 of the second pivoting portion 51 of the securing member 50 is received in the receiving notch 19. A pivoting fastener 60 is inserted in the first pivoting holes 181 and the second pivoting hole 513 to attach pivotally the securing member 50 to the base 11 of the mounting bracket 10. Then, the securing member 50 is pivoted towards the inside of the base 11. The second engaging portion 534 abuts against the first engaging portion 131, deforms elastically, and the second engaging portion 534 rebounds when the second engaging portion is aligned with the cutout 1311 of the first engaging portion 131. The second engaging portion 534 engages with the cutout 1311 of the first engaging portion 131. The securing member 50 is securely mounted to the mounting bracket 10. The protrusion 522 of the pressing portion 52 abuts against the mounting end 35 of the securing member 50 to sandwich the mounting end 35 between the pressing portion 52 and the blocking plate 15.

In disassembly, a distal end of the handling portion 533 of the mounting portion 53 is pushed to disengage the second engaging portion 534 from the cutout 1311. The securing member 50 is rotated toward the outside of the base 11, and the pressing portion 52 moves away from the mounting end 35 of the mounting piece 30. Thus, the PCI card 70 is easily removed from the mounting bracket 10.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A mounting apparatus comprising:
a mounting bracket, comprising a base, a blocking plate extending from an outer surface of the base, and a first engaging portion extending from an inner surface of the base; a mounting piece adapted to mount a PCI card on the inner surface of the base of the mounting bracket, the mounting piece comprising an elongated body and a mounting end extending from the elongated body; and a securing member comprising a first pivoting portion pivotably attached to the mounting bracket, a pressing portion extending from the first pivoting portion, and a mounting portion extending from the pressing portion; the pressing portion abuts the mounting end to sandwich the mounting end between the pressing portion and the blocking plate; the mounting portion comprises a securing portion; the securing portion comprises a handling portion and a second engaging portion extending from the handling portion; the second engaging portion engages the first engaging portion; the handling portion is located on of the inner surface of the base; the handling portion configured to drive the second engaging portion to disengage from the first engaging portion when the handling portion is pressed towards the a direction as the securing member engaging the mounting bracket; and wherein the securing member engages the mounting bracket, the first pivoting portion configured to rotate substantially along the direction as the handling portion until the pressing portion abuts the mounting end.

2. The mounting apparatus of claim 1, wherein the first engaging portion defines a cutout, the second engaging portion comprises a securing tab, and the securing tab engages the cutout.

3. The mounting apparatus of claim 2, wherein the first engaging portion extends obliquely from the inner surface of the base to guide the securing tab to engage with the cutout when the securing member is rotated toward the first engaging portion.

4. The mounting apparatus of claim 1, wherein the mounting portion further comprises a connecting portion extending from the pressing portion, and the handling portion extends from the connecting portion; wherein the pressing portion and the handling portion are disposed at opposite sides of the connecting portion.

5. The mounting apparatus of claim 1, wherein the first pivoting portion defines a first pivoting hole, the base comprises a second pivoting portion, and the second pivoting portion defines a second pivoting hole corresponding to the first pivoting hole.

6. The mounting apparatus of claim 1, wherein the pressing portion comprises a protrusion that abuts the mounting end.

7. The mounting apparatus of claim 1, wherein the handling portion is an elastic plate.

8. A mounting apparatus, comprising:
a mounting bracket, the mounting bracket comprising a base, the base having a slot and an opening adjacent to the slot, a blocking plate extending from one edge of the opening, and a first engaging portion extending from another edge of the opening opposite to the blocking plate;
a mounting piece adapted to mount a PCI card to the mounting bracket, the mounting piece comprising an elongated body and a mounting end extending from the elongated body, the elongated body covering the slot; and
a securing member pivotably attached to the mounting bracket, the securing member comprising a pressing portion, a handling portion, and a second engaging portion extending from the handling portion; the pressing portion abuts the mounting end to sandwich the mounting end between the pressing portion and the blocking plate; the second engaging portion engages the first engaging portion; the handling portion and the pressing portion are located on opposite sides of the base; the handling portion is configured to drive the second engaging portion to disengage from the first engaging portion when the handling portion is pressed towards the a direction as the securing member engaging the mounting bracket; and wherein the securing member engages the mounting bracket, the first pivoting portion configured to rotate substantially along the direction as the handling portion until the pressing portion abuts the mounting end.

9. The mounting apparatus of claim 8, wherein the securing member further comprises a first pivoting portion, pivotably attached to the mounting bracket, and a mounting portion, extending from the pressing portion; the pressing portion extends from the first pivoting portion; and the mounting portion comprises a connecting portion, extending from the pressing portion, and the handling portion, extending from the connecting portion.

10. The mounting apparatus of claim 9, wherein the first engaging portion defines a cutout, the second engaging portion comprises a securing tab, and the securing tab engages the cutout.

11. The mounting apparatus of claim 10, wherein the first engaging portion extends obliquely from the another edge of the opening to guide the securing tab to engage the cutout when the securing member is rotated toward the first engaging portion.

12. The mounting apparatus of claim 9, wherein the pressing portion and the handling portion are disposed at opposite sides of the connecting portion.

13. The mounting apparatus of claim 9, wherein the first pivoting portion defines a first pivoting hole, the mounting bracket further comprises a second pivoting portion, the second pivoting portion defining a second pivoting hole corresponding to the first pivoting hole.

14. The mounting apparatus of claim 8, wherein the pressing portion comprises a protrusion that abuts the mounting end.

15. The mounting apparatus of claim 8, wherein the handling portion is an elastic plate.

16. The mounting apparatus of claim 8, wherein the block plate is on an outer surface of the base; the mounting piece is adapted to mount the PCI card on an inner surface of the base; and the handling portion is located on the inner surface of the base.

* * * * *